June 17, 1930. T. H. MAYFIELD 1,764,218
GRAIN SHOE
Filed June 1, 1929
Fig.1.
Fig.2.
Fig.3.
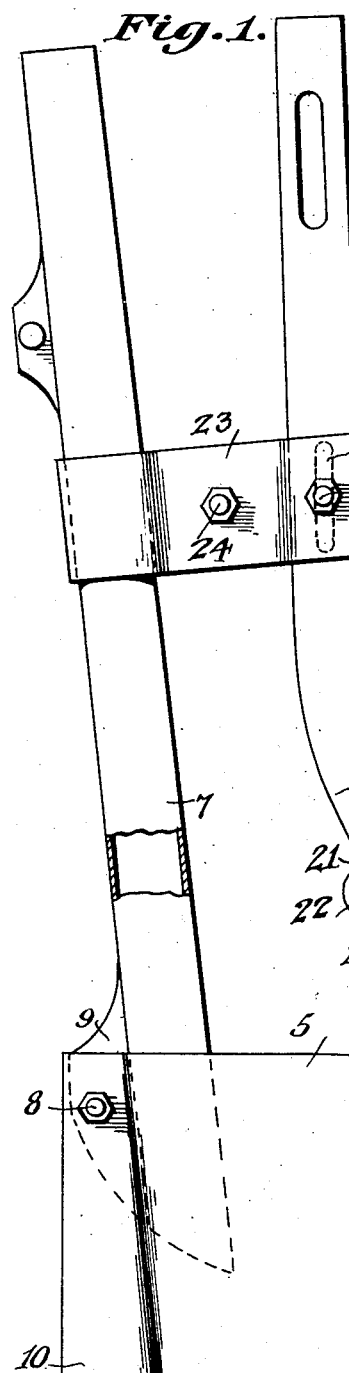
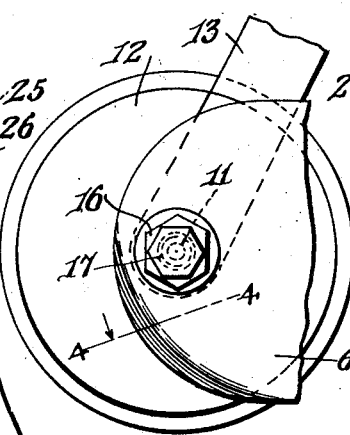
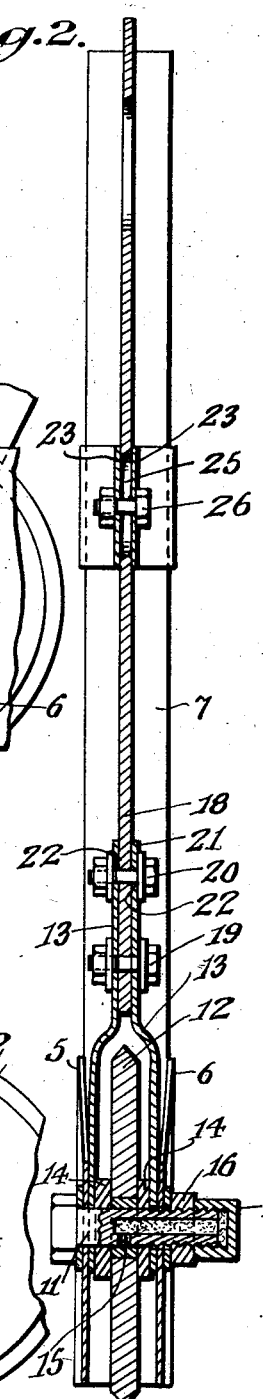
Fig.4.
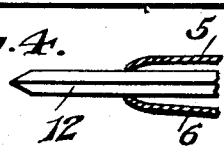
Thomas H. Mayfield, Inventor
By C.A.Snow & Co.
Attorneys Patented June 17, 1930

1,764,218

UNITED STATES PATENT OFFICE

THOMAS H. MAYFIELD, OF ROBY, TEXAS

GRAIN SHOE

Application filed June 1, 1929. Serial No. 367,710.

This invention relates to an attachment for use in connection with cotton and corn planters, the primary object of the invention being to provide a device to be attached to the planter to open the furrow formed by the machine to prevent the loose or dry earth from filling the seed furrow until the seed has been deposited therein.

An important object of the invention is to provide a device of this character which may be readily and easily positioned on a planter now in use, eliminating the necessity of making changes in the construction of the planter to mount the device.

Another object of the invention is to provide an attachment for opening a furrow, which may be adjusted vertically with respect to the machine to cause the disk forming a part of the device to operate at various depths.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of an attachment constructed in accordance with the invention.

Figure 2 is a longitudinal sectional view through the disk and supporting bar forming a part of the attachment.

Figure 3 is a fragmental detail view of the forward portion of the attachment.

Figure 4 is a sectional view taken on line 4—4 of Figure 3.

Referring to the drawing in detail, the attachment embodies a pair of spaced plates 5 and 6 respectively, which plates are relatively wide, the forward ends thereof being curved, as clearly shown by Figure 1 of the drawing. The rear ends of the plates 5 and 6 are bent inwardly to fit around the pipe 7 constituting the seed spout of the planter, and through which seed passes to the furrow.

A bolt indicated at 8 passes through the plates 5 and 6 and through the flange 9 of the spout 7, to secure the plates 5 and 6 in position. The lower rear corners 10 of the plates are flared so that the soil will be pushed laterally away from the furrow.

The reference character 11 designates a bolt on which the disk 12, forming a part of the attachment operates, the bolt 11 passing through openings in the plates 5 and 6, which provide bearings for the bolt. This bolt 11 also passes through openings in the arms 13 that rest against the plates 5 and 6, the arms being spaced from the disk 12, by means of the washers 14 which also act to prevent the lubricating material forced to the hub of the disk 12, from passing from the bolt 11.

As shown, the bolt is provided with a bore extending from one end thereof and terminating at a point directly within the opening of the disk 12, the bolt being provided with a lateral opening 15 communicating with the bore so that lubricating material may pass through the bolt and laterally to the disk 12 to lubricate the disk. Positioned on the bolt is a nut 16 that secures the various elements of the attachment, in position. A grease cup indicated at 17, is fitted over one end of the bolt and supplies grease to the bore.

The reference character 18 designates the plow foot of the usual planter to which the arms 13 are bolted, as by means of the bolts 19 and 20 respectively. Enlargements 21 are formed at the free ends of the arms 13 and are provided with openings 22 to receive the bolt 20 so that the arms 13 may be adjusted to cause the disk 12 to operate at various angles or depths.

The forward lower ends of the plates 5 and 6 are curved inwardly towards the disk 12 and guard the space between the disk and the plates 5 and 6 against the earth passing to the bolt to clog and prevent movement of the disk 12. Plates 23 are bolted together at 24 and have curved ends fitted around the curved members 17 and 18 to secure the members 17 and 18 against movement with respect to each other under normal conditions.

An elongated opening 25 is provided in the member 18 and receives the bolt 26 that passes through the plates 23, so that the plow foot 18 may be adjusted to further regulate the depth of operation of the disk 12.

From the foregoing it will be obvious that due to this construction, the plates 5 and 6 will hold the side walls of the furrow against falling in to cover the furrow, until the seeds have been deposited in the furrow.

I claim:

1. A furrow opening device for planters, comprising a pair of parallel spaced plates, a disk operating between the forward ends of the plates, adjustable members for connecting the plates and disk to the plow foot of a planter, and means for connecting the plates to the delivery spout of a planter.

2. A furrow opening device for planters, comprising a pair of side plates, a bolt connecting the forward ends of the plates, a disk mounted for rotary movement on the bolt, the forward ends of the plates being curved inwardly to contact with the disk, means for adjustably connecting the device to the plow foot of a planter, and means for connecting the plates to the delivery spout of a planter to feed seeds between the plates.

3. A furrow opening device for planters, comprising a pair of plates arranged in parallel spaced relation with each other, a disk positioned between the forward ends of the plates, a pair of arms extending upwardly from the plates, means for securing the arms to the plow foot of a planter to adjustably connect the device to the planter, the rear ends of the plates being curved inwardly, means for securing the rear ends of the plates to the delivery spout of a planter, and the lower rear edges of the plates being flared to direct material laterally.

In testimony that I claim the foregoing as my own, I have hereto affixed my signature.

THOMAS H. MAYFIELD.